Sept. 9, 1969      G. L. DE LARM      3,465,832

FARM IMPLEMENT LIFT ASSEMBLY AND DRAWBAR COMBINATION

Filed Dec. 27, 1966      2 Sheets-Sheet 1

INVENTOR:
Gerald L. DeLarm

BY: Robert W. Erickson

ATTORNEY

INVENTOR:
Gerald L. DeLarm

BY:

*Robert W. Erickson*

ATTORNEY

United States Patent Office 3,465,832
Patented Sept. 9, 1969

3,465,832
FARM IMPLEMENT LIFT ASSEMBLY AND DRAWBAR COMBINATION
Gerald L. De Larm, Rte. 2, Wyoming, Iowa 52632
Filed Dec. 27, 1966, Ser. No. 604,713
Int. Cl. A01b 63/10, 63/14, 63/32
U.S. Cl. 172—491                                         5 Claims

ABSTRACT OF THE DISCLOSURE

An apparatus for use with farm implements broadly classified as "ground-working" tools, carts and tractors. A combination drawbar and automatic (hydraulic) lift assembly permits raising the implement while in ground-working position, thereby freeing the same from various debris which has collected at its leading edge. To facilitate changing from one implement to another, the drawbar is sectioned.

---

The present invention is applicable to various implements employed in the agricultural industry, and, more particularly, to an automatic lift assembly and drawbar combination for use with various farming implements. More specifically, my invention is directed toward a novel drawbar and lift assembly therefor, which combination is uniquely adaptable to farming implements broadly classified in the industry as ground-working tools. Such devices are ground-conditioning tools which work on and underneath the surface of the ground to break the soil and, in most instances, to overturn the soil whereby the same becomes aerated and loose, and thus more susceptible to receiving and retaining moisture and various seeds and plantings.

The agricultural industry employs a wide variety of ground-working farming implements, each with its own specific purpose, but all of which have the common characteristic of "working" the soil such that the latter is overturned, or heaved, intended thereby to become aerated and moisture retentive. Exemplary of the various ground-working implements to which my invention is applicable, are plows, harrows, hoes, rotary-disc hoes, spring-tooth harrows, spike-tooth harrows, etc. To those having skill in the art of farming, and being cognizant of the various tools employed therein, it will immediately be recognized that all these implements share the common attribute of "working" the soil.

In general, a ground-working farm implement is employed in combination with a wheeled cart, the latter usually being drawn or pulled by a powered vehicle such as a tractor. The cart is generally connected to the rear of the tractor by suitable means, and the farm implement is detachably affixed to the rear end of the cart. One purpose of the cart is to enable easy transpotration of the implement, say from one field to another, thus saving time in loading and unloading the implement. Between the cart and the farm implement, a drawbar, or dragbar is normally placed, which, when the implement is in "field-work" operation, as distinguished from "road-travelling" position, is "drawn" or "dragged" along the level of the ground. The drawbar serves as the link between the cart and implement, and functions to maintain equality among the portions of the trailing implement. Some of such drawbars are integral pieces of the particular type of ground-working equipment, while others are separate therefrom and require hook-up or connection to both the cart and the implement itself.

After operating several different types of farming implements in combination with drawbars, and in conjunction with a tractor and a cart, I discovered exactly how unwieldy and awkward the use of the presently available combinations can be. Further, currently available combinations of implements and carts are extremely tedious to use, and require the expenditure of long periods of time to convert from one type of implement to another. For example, considering the use of a harrow to "work" the soil, followed by a hoe (a rotary-disc hoe would be exemplary) to provide the uniform furrows which receive the seed or plantings, I found that a considerable amount of time was expended in changing from one implement to the other, and, with either or both implements, the drawbar became clogged with clods, hay, straw, dried-up stalks from a previous crop, stones, twigs, and other miscellaneous debris. Also, the implement itself, especially the front end edge and middle portion thereof, became clogged with such matter. This required many periods where the field-work was necessarily stopped, and I would dismount the power vehicle to clean the debris from the drawbar and implement. Furthermore, there were times when, while working an entire field, the implement would either run too deep, or too shallow, with the deleterious result that the soil would not be uniformly aerated. Another difficulty resides in the fact that the presently available drawbars require an excessive amount of time and effort, not to mention the cost, in converting from a harrow drawbar to one which is suitable for use with a hoe.

A principal object of my invention is to provide an automatic, controlled lift assembly whereby the trailing drawbar and implement can be raised, thereby becoming free from the debris which collects at the leading edges thereof.

Another object is to provide a sectioned drawbar for use with a farm cart, which drawbar facilitates changing from one particular piece, or type of ground-working farming implement to another.

Still another object of my invention resides in the ability thereof to overcome the difficulties arising from the collection of debris at the leading edge of the implement and drawbar, while simultaneously converting such debris into a form of mulch which becomes intimately admixed with the soil being worked.

Another object is to permit unclogging the leading edge of the drawbar and the leading edge of the implement without the necessity for the operator of the implement to leave the powered vehicle—i.e. the tractor.

Therefore, in a broad embodiment, the present invention provides a farm implement drawbar and lift assembly therefor which comprises, in combination: (a) a cart having a frame adaptable for connection to a tractor by means of a center shank, said frame having side members extending rearwardly and outwardly from said center shank, and terminating, in the end sections thereof, parallel to said shank, and a drawbar detachably affixed to a ground-working farm implement; (b) longitudinal lift arms extending rearwardly from said cart, and attached, at the front ends thereof, to said drawbar, flexible means at both the rear and front ends of said lift arms, connecting said lift arms to the rear and front edges of said farm implement; (c) a transverse tilt shaft rotatably mounted to the side members of said frame, having elevating arms immovably fixed at the outer ends thereof, said elevating arms extending rearwardly and being attached to said drawbar; (d) a tilt shaft arm immovably affixed to said tilt shaft at a central locus thereof, said arm extending upward from said shaft and terminating in movable connection with a pull rod, said pull rod extending forward of said arm and terminating in connection with a push yoke; and, (e) a lower portion of said push yoke rotatably mounted to said center shank and an upper portion of said push yoke extending obtusely toward said drawbar and connected thereto by a bar tilt rod, said push yoke activated by hydraulic means whereby the force exerted by said hydraulic means causes forward motion of said push yoke, said pull rod and said tilt shaft arm, the latter effecting forward rotation of said tilt shaft, thereby raising said elevating arms, said draw bar and said lift arms.

The farm implement lift assembly and drawbar combination hereinabove described, can be further characterized in that the bar tilt rod is rotatably connected, at one end thereof, to the upper portion of said push yoke, and rotatably connected at its other end to said drawbar. In another embodiment, the bar tilt rod is rotatably connected to an upwardly protruding U-shaped center tongue permanently affixed to said drawbar.

The pull rod is preferably constructed of telescoping upper and lower sections, the upper section being movably connected to the push yoke at a central locus thereof. Furthermore, each of the upper and lower telescoping section of said pull rod are equipped with several holes which can be aligned with a locating pin, thereby obstructing and inhibiting the telescoping of said pull rod. The precise position of the pin is dependent upon the character of the particular implement being drawn.

The drawbar is sectioned to provide a center section, to which the elevating arms are attached, separate end sections to accommodate a hoe, and separate wings detachably connected to each outside end of the end sections in order to accommodate a harrow. The flexible means connecting the lift arms to said farm implement are of different lengths, and positioned such that elevation of the drawbar and lift arms raises only the front edge and middle portion of the farm implement, while the rear edge and rear portion thereof remains in ground-working position in order to continue overturning and heaving the soil, and, more importantly, to intermix the soil with the debris, thereby effectively converting the latter into mulch. As the leading edges of the drawbar and implement are raised, the collected debris comes loose therefrom, and is admixed with the soil being heaved by the trailing edge and rear portion of the implement. Additionally, the leading edge of the drawbar, and front and middle sections of the implement, are freed from the debris, thereby becoming once more capable of carrying out their intended function of working the ground.

These, as well as other embodiments and objectives of my invention will become evident from the following description of the accompanying drawings. It is understood that the drawings are presented for the sole purpose of illustration, and are not, therefore, intended to limit the present invention beyond the scope and spirit of the appended claims.

DESCRIPTION OF DRAWINGS

Briefly.

Figure 1:
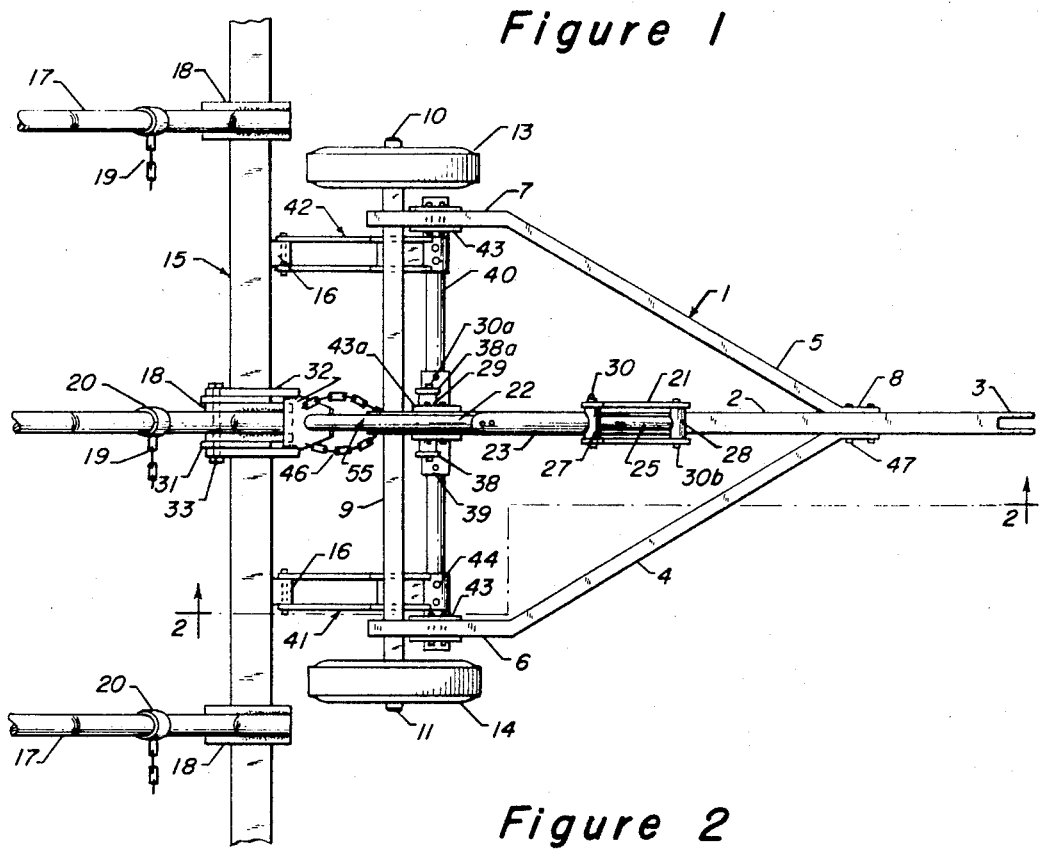
FIGURE 1 represents a plan view of the cart, the lift assembly, the dragbar and the front portion of the lift arms.

With reference now to FIGURE 1, there is presented a plan view of the cart, lift assembly, dragbar and a portion of the lift arms. The cart 1 consists of a center shank 2 equipped with a forward end 3 suitably arranged for connection to a powered vehicle such as a tractor (not illustrated). The cart is formed by side frame members 4 and 5, braced to center shank 2 by means of bolts 47 and brackets 8. Side frame members 4 and 5 extend rearwardly and outwardly from center shank 2, and terminate, in the end portions thereof, in sections 6 and 7 which are parallel to center shank 2. The rear sections 6 and 7 of side frame members 4 and 5, as well as center shank 2, rest upon, and are permanently connected (by any suitable means such as welding) to transverse member 9, thereby completing the frame of cart 1. The transverse frame member 9 terminates in wheel hubs 10 and 11 which secure wheels 13 and 14 to the cart, and supply the movement to the cart. It is recognized that carts such as this are old in the art, and no claim is herein made to the cart, except as is necessary to define the invention.

Implement drawbar 15, only a portion of which is shown in FIGURE 1, is equipped with lugs 16 to which are attached elevating arms 41 and 42 by means of bolts. These elevating arms also serve to pull the draw bar and ground-working implement when the cart is in motion. The drawbar 15 is removably attached to lift arms 17 by means of brackets 18 (details of brackets 18, for attaching lift arms 17 to drawbar 15, are presented in FIGURES 3 and 4). The brackets 18 are adapted such that they engage drawbar 15, and are held thereto by means of bolts. Each of said lift arms is equipped with flexible means 19 secured to the front portion of lift arms 17 by clamps 20.

Figure 3:
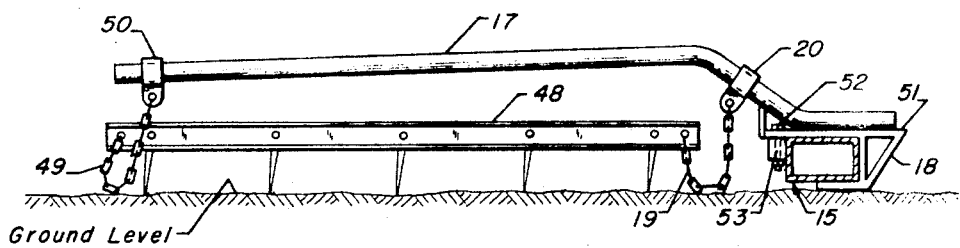
FIGURE 3 is a right-side elevation of the dragbar and lift arms, and indicates the position of a spike-tooth harrow when in ground-working use.
Figure 4:
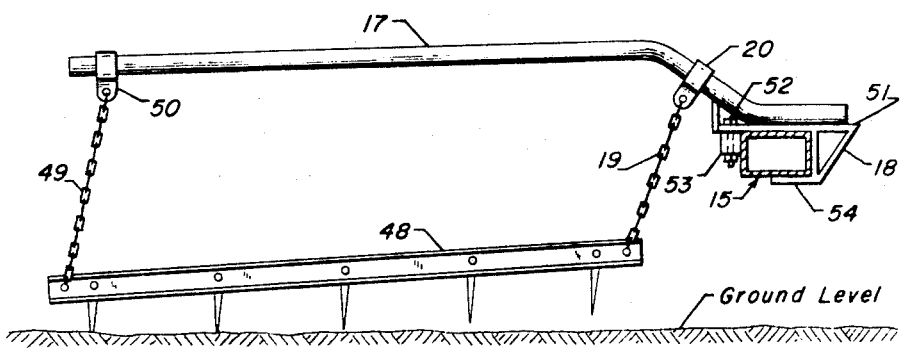
FIGURE 4 is a right-side elevation of the dragbar and lift arms, and indicates the position of the spike-tooth harrow when in debris-freeing and mulch-making use.

Referring now to FIGURES 3 and 4, in order to preserve a degree of continuity while describing the relationship between lift arms 17 and a ground-working implement, FIGURE 3 represents a side view of a spike-tooth harrow 48 in ground-working, or fieldwork, position, and the preferred manner in which the lift arms 17 are attached to drawbar 15. Lift arms 17 are permanently affixed to the brackets 18 by welding, the brackets having a substantially flat upper surface 51 which is superimposed upon, and extends beyond or behind drawbar 15, and a lower, shorter flat surface 54 which extends partially beneath the under surface of the drawbar. The bracket 18 is attached to drawbar 15 by bolt 52 through upper plate 51 into lug 53, the latter being solidly connected (welded) to the rear edge of drawbar 15. It should be noted that bracket 18 forms a similated tongue and groove joint with drawbar 15, via upper plate 51 and lower plate 54. I have found that this method of connecting the lift arms to the drawbar greatly facilitates changing from one ground-working farm implement to another.

Each of said lift arms 17 is equipped with flexible means 49 at the rear portion thereof, and secured thereto by way of clamps 50. Although illustrated as chains 19 and 49, which are preferred from the standpoint of strength, flexibility and durability, such flexible means would include rope, wire cable, etc. FIGURE 4 is identical to FIGURE 3 with the exception of showing the raised drawbar and front edge of implement 48, with respect to the level of the ground being worked. The mechanism, by which the drawbar is raised, in order to free the same from collected debris as hereinbefore set forth, is described by again referring to FIGURE 1, and also to FIGURE 2. However, it should be first noted from FIGURE 4, that chains 19 and 49 are of different length, and positioned such that the entire implement 48 is not raised from the level of the ground. That is, chain 49 is longer than chain 19, which causes the rear portion of implement 48 to remain in contact with the soil being worked. In this manner, it is seen that the debris which is freed from the drawbar and front portion of the implement, is intimately admixed with the ground being overturned and heaved by the rear portion of the farm implement.

Referring once again to FIGURE 1, tilt shaft 40 is situated transverse of center shank 2, and parallel to transverse member 9. The ends of tilt shaft 40 terminate at the parallel rear portions 6 and 7 of side frame members 4 and 5, and are rotatably secured thereto by end mounting brackets 43, which in turn are immovably attached to the side members. Attached to center shank 2, on a common axis with brackets 43, is located a center tilt shaft mounting bracket 43a. Each of these three mounting brackets is provided with a cylindrical sleeve through which, with respect to center mounting bracket 43a, and into which, with respect to end mounting brackets 43, tilt shaft 40 is passed, and the free rotation thereof is thereby unhindered. On both ends of tilt shaft 40, in close proximity to the extremities thereof, elevating arms 41 and 42 are immovably affixed by means of bolts 44 such that forward rotation of tilt shaft 40 causes elevating arms 41 and 42 to raise. Since the rearward extremities of elevating arms 41 and 42 are secured to drawbar 15 by way of lugs 16, the drawbar is also raised. Similarly, tilt shaft master arm 38 is secured immovably to tilt shaft 40 by bolts through cylindrical sections 39. Thus, although tilt shaft 40 is free to rotate within center bracket 43a, and in end brackets 43, any forward movement of the tilt shaft master arm 38 effects rotation of the tilt shaft and, as previously set forth, raises drawbar 15 by means of elevating arms 41 and 42.

Figure 2:
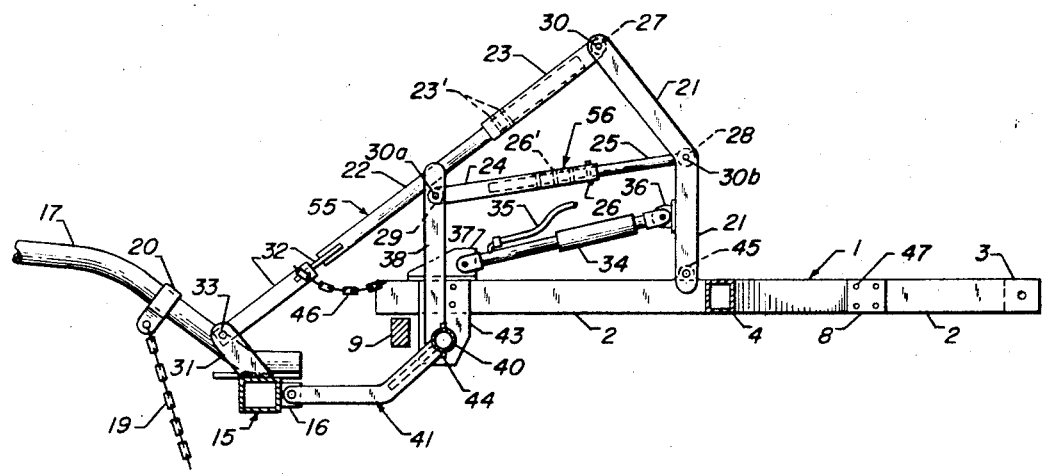
FIGURE 2 is a right-side elevation of the lift assembly configuration while the farm implament is in ground-working position, taken along the staggered section line 2—2 of FIGURE 1.

Upon referring to FIGURE 2, the mechanism by which drawbar 15 is raised will become evident. FIGURE 2 is a side elevation of the lift assembly, taken along the line 2—2' of FIGURE 1, while in ground-working position, and shows center shank 2 having movably mounted thereon, by means of bracket 45, and at a center locus thereof, hydraulic push yoke 21. When in fieldwork position as shown, the lower portion of push yoke 21 is substantially perpendicular to center shank 2, and has an upper portion extending rearwardly and obtusely toward the drawbar 15.

The upper extremity of the obtuse portion of push yoke 21 is movably connected to the upper portion 23 of a telescoping bar tilt rod 55, by means of cylinder end 27 and bolt 30. The lower portion 22 of bar tilt rod 55 is in turn connected to a center U tongue 31 permanently mounted on drawbar 15. The connection to center U-tongue 31 is made by a yoke 32, to which the lower portion 22 of the bar tilt rod is permanently connected. Yoke 32 is in turn adapted to connectively swivel with center tongue 31 by way of bolt 33. Chains 46 are employed for safety purposes in securing yoke 32 to the rear end of center shank 2. As indicated in FIGURE 2, upper portion 23 of bar tilt rod 55 is equipped with a hole 23'. When in fieldwork position as illustrated, no pin will be in hole 23'. However, when it is desired to transport the implement from one field to another, a pin (not illustrated) will be inserted into hole 23. This will inhibit the movement of lower section 22 and upper section 23 with respect to each other, and the application of hydraulic pressure will raise the lift arms to a point such that they are substantially perpendicular to the ground, the entire implement is raised from the ground, and transportation thereof is readily facilitated.

The upper end of the tilt shaft master arm 38 is rotatably connected to the lower section 24 of the master arm pull rod 56 by means of cylinder end 29 and bolt 30a. The lower section 24 of the master arm pull rod 56, and cylinder end 29 thereof, form a T which is adapted to rotate within the side members of tilt shaft master arm 38. The upper section 25 of the telescoping pull rod 56 terminates in a T with cylinder end 28, the latter being rotatably connected to the center portion of push yoke 21, by means of bolt 30b, at the point where the obtuse angle is formed. Upper and lower sections 24 and 25 of the telescoping pull rod 56 are each provided with holes 26' which can be aligned and thus adapted to receive pin 26 which is used to restrict the telescoping of the two sections of pull rod 56. As hereinbefore set forth, the precise location of the pin 26 will be dependent upon the character of the particular implement being drawn. Impetus is supplied to push yoke 21 by way of hydraulic cylinder 34 attached to center shank 2 by way of flange 37, and to push yoke 21 by way of flange 36. Hydraulic cylinder 34 is activated by the pressure applied through hydraulic fluid in hose 35, only a portion of which is illustrated.

In order to raise drawbar 15, lift arms 17 and the front portion of implement 48 (as shown in FIGURE 4), the operator of the tractor activates the hydraulic system by way of the fluid in hose 35, thereby effecting elongation of hydraulic cylinder 34. This in turn causes forward motion of push yoke 21 and, by means of sections 24 and 25 of pull rod 56, with pin 26 preventing telescoping thereof, tilt shaft master arm 38 is "pulled" forward. Since master arm 38 is bolted immovably to tilt shaft 40, the latter is set in forward rotation, being free to so rotate in end brackets 43 and in center bracket 43a. The clockwise rotation of tilt shaft 40 is seen to cause elevating arms 41 and 42 to be raised, since the rotation of tilt shaft 40 with respect to said elevating arms is impeded by bolts 44. Via the connection with drawbar lugs 16, elevating arms 41 and 42 in turn raise drawbar 15.

As hereinbefore set forth, one embodiment of the present invention affords a drawbar which greatly facilitates changing from one particular ground-working farm implement to another. This drawbar is sectioned to provide, for example, both for adaption to a hoe, and for the rapid conversion therefrom to a harrow, the latter implement generally considerably wider than the former. The preferred form which the sectioned drawbar takes is shown in FIGURE 5, simplified for convenience and a clear understanding.

Figure 5:
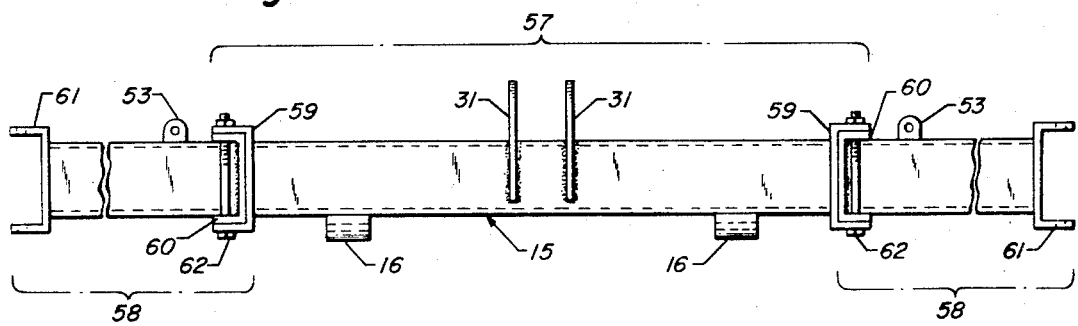
FIGURE 5 is a plan view of the sectioned dragbar.

FIGURE 5 shows a plan view of drawbar 15 having lugs 16 at its leading edge, to which lugs are attached elevating arms 41 and 42, as shown in FIGURE 1. Also indicated in FIGURE 5 are lugs 53 to which the brackets 18 of lift arms 17 are attached as indicated in FIGURES 3 and 4. At a central locus of drawbar 15, center U tongue 31 is permanently affixed, extending rearwardly and upwardly, and adapted to receive yoke 32 of bar tilt rod 55. Center section 57 of drawbar 15 terminates in end yokes 59; as are adapted by butt ends 60, hoe wings 58 are attached to center section 57 by bolts 62. Each of the opposite ends of hoe wings 58 terminate in yoke ends 61 intended to receive the corresponding adaptable butt ends of the harrow wings (not illustrated).

From the foregoing specification and description of the accompanying drawings, it will be readily ascertained by those having expertise in the use of ground-working farm implements, that I have provided a farm implement lift assembly and drawbar combination which facilitates working the soil, accomplishing the same in a more economical and significantly more convenient manner. In addition, I have provided means whereby the debris, otherwise considered a detrimental characteristic of the soil being worked, is transformed into a valuable, useful mulch whereby the soil becomes more uniform, more moisture retentive and more susceptible for receiving various seeds and plantings.

I claim as my invention:

1. A farm implement drawbar and lift assembly therefor which comprises, in combination:

(a) a cart having a frame adaptable for connection to a tractor by means of a center shank, said frame having side members extending rearwardly and outwardly from said center shank and terminating, in the end sections thereof, parallel to said shank, and a drawbar detachably affixed to a ground-working farm implement;

.(b) longitudinal lift arms extending rearwardly from said cart, and attached, at the front end thereof, to said drawbar, flexible means of different lengths at both the rear and front ends of said lift arms, connecting said lift arms to the rear and front edges of said farm implement and positioned such that elevation of said drawbar and lift arms raises only the front edge of said farm implement;

(c) a transverse tilt shaft rotatably mounted to the side members of said frame, having elevating arms immovably fixed at the outer ends thereof, said elevating arms attached to said drawbar;

(d) a tilt shaft arm immovably affixed to said tilt shaft at a central locus thereof, said arm extending upwardly from said shaft, and terminating in movable connection with a pull rod, said pull rod extending forward of said arm and terminating in connection with a push yoke; and, (e) a lower portion of said push yoke rotatably connected to said center shank and an upper portion of said push yoke extending obtusely toward said drawbar, and connected thereto by a bar tilt rod, said push yoke activated by hydraulic means whereby the force exerted by said hydraulic means causes forward motion of said punch yoke, said pull rod and said tilt shaft arm, the latter effecting forward rotation of said tilt shaft, thereby raising said elevating arms, said drawbar, said lift arms, and the frontal edge of said groundworking farm implement.

2. The assembly of claim 1 further characterized in that said bar tilt rod is rotatably connected at one end to said upper portion of said push yoke, and rotatably connected at the other end to said drawbar.

3. The assembly of claim 1 further characterized in that said bar tilt rod is rotatably connected to an upwardly protruding U-shaped center tongue permanently affixed to said drawbar.

4. The assembly of claim 1 further characterized in that said pull rod is movably and rotatably connected to said push yoke at a central locus thereof.

5. The assembly of claim 1 further characterized in that said drawbar is sectioned to provide a center hoe section and harrow wings detachably and immovably connected to each end of said center hoe section.

References Cited

UNITED STATES PATENTS

| | | | |
|---|---|---|---|
| 104,423 | 6/1870 | Casey | 172—317 |
| 3,021,908 | 2/1962 | Dlugosch | 172—316 XR |

ROBERT E. PULFREY, Primary Examiner

J. W. PETERSON, Assistant Examiner

U.S. Cl. X.R.

172—474, 478, 482, 488